United States Patent
Asahara et al.

(10) Patent No.: US 12,464,363 B2
(45) Date of Patent: Nov. 4, 2025

(54) COMMUNICATION RESOURCE ALLOCATION DEVICE, COMMUNICATION RESOURCE ALLOCATION METHOD, AND COMPUTER READABLE MEDIUM

(71) Applicant: Mitsubishi Electric Corporation, Tokyo (JP)

(72) Inventors: Takashi Asahara, Tokyo (JP); Masaaki Takeyasu, Tokyo (JP); Teruko Fujii, Tokyo (JP); Shusaku Umeda, Tokyo (JP); Mari Ochiai, Tokyo (JP); Takeshi Suehiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 362 days.

(21) Appl. No.: 18/207,355

(22) Filed: Jun. 8, 2023

(65) Prior Publication Data

US 2023/0319579 A1 Oct. 5, 2023

Related U.S. Application Data

(63) Continuation of application No. PCT/JP2021/004090, filed on Feb. 4, 2021.

(51) Int. Cl.
*H04W 16/04* (2009.01)
*G08G 1/01* (2006.01)

(52) U.S. Cl.
CPC .......... *H04W 16/04* (2013.01); *G08G 1/0116* (2013.01)

(58) Field of Classification Search
None
See application file for complete search history.

(56) References Cited

U.S. PATENT DOCUMENTS 5,798,949 A * 8/1998 Kaub ................... G08G 1/0104
708/101
11,526,711 B1 * 12/2022 Cardona ................ G06Q 50/26
(Continued)

FOREIGN PATENT DOCUMENTS

JP 2003-123185 A 4/2003
JP 2003-168179 A 6/2003
(Continued)

OTHER PUBLICATIONS

International Search Report (PCT/ISA/210) issued in PCT/JP2021/004090, dated Apr. 13, 2021.
(Continued)

*Primary Examiner* — Lonnie V Sweet
(74) *Attorney, Agent, or Firm* — Birch, Stewart, Kolasch & Birch, LLP

(57) ABSTRACT

A communication resource allocation device (10) identifies a hazardous behavior that may cause a traffic accident and has occurred in each of monitoring target areas included in a communication area of a base station (20) in a past reference period, so as to determine a hazard level for each of the monitoring target areas. The communication resource allocation device (10) allocates communication resources to each of the monitoring target areas based on the determined hazard level. The communication resource allocation device (10) distributes information to a roadside device (30) and an in-vehicle device (40) in each of the monitoring target areas, using the allocated communication resources.

11 Claims, 17 Drawing Sheets

(56) References Cited

U.S. PATENT DOCUMENTS

| | | | |
|---|---|---|---|
| 2009/0154379 A1* | 6/2009 | Hayashi | H04W 72/04 370/280 |
| 2009/0161644 A1 | 6/2009 | Suzuki et al. | |
| 2009/0203388 A1* | 8/2009 | Karaoguz | H04W 4/18 455/456.3 |
| 2009/0296680 A1 | 12/2009 | Suzuki et al. | |
| 2009/0328219 A1* | 12/2009 | Narayanaswamy | H04L 63/1408 709/239 |
| 2013/0027222 A1 | 1/2013 | Kosai et al. | |
| 2016/0049075 A1 | 2/2016 | Sato et al. | |
| 2018/0081181 A1* | 3/2018 | Lambert | G02B 27/0189 |
| 2018/0222424 A1* | 8/2018 | Kodama | B60R 21/0134 |
| 2018/0343587 A1* | 11/2018 | Condeixa | H04W 4/027 |
| 2019/0084578 A1* | 3/2019 | Alasry | B60W 50/0098 |
| 2020/0007661 A1* | 1/2020 | Kim | G08G 1/161 |
| 2020/0066146 A1* | 2/2020 | Ichikawa | G06V 20/54 |
| 2020/0134864 A1* | 4/2020 | Raichelgauz | H04W 4/46 |
| 2020/0242922 A1* | 7/2020 | Dulberg | G08G 1/166 |
| 2020/0244612 A1* | 7/2020 | Weldemariam | H04L 51/226 |
| 2020/0349843 A1 | 11/2020 | Liu et al. | |
| 2020/0359257 A1* | 11/2020 | Kim | H04W 84/005 |
| 2020/0371516 A1* | 11/2020 | Walossek | G05D 1/0027 |
| 2021/0029510 A1 | 1/2021 | Arai et al. | |
| 2021/0039639 A1* | 2/2021 | Song | G06V 20/584 |
| 2021/0056329 A1 | 2/2021 | Sakuma et al. | |
| 2021/0136538 A1* | 5/2021 | Shah | G06Q 30/0201 |
| 2021/0368311 A1* | 11/2021 | Perraud | H04W 4/44 |
| 2022/0068133 A1* | 3/2022 | Back | G06Q 20/36 |
| 2022/0276618 A1* | 9/2022 | Aroskar | G06F 16/29 |
| 2025/0095493 A1* | 3/2025 | Nordbruch | G08G 1/147 |
| 2025/0218287 A1* | 7/2025 | Lin | G08G 1/0116 |

FOREIGN PATENT DOCUMENTS

| | | |
|---|---|---|
| JP | 2008-70987 A | 3/2008 |
| JP | 2008-129624 A | 6/2008 |
| JP | 2008-310469 A | 12/2008 |
| JP | 2009-152670 A | 7/2009 |
| JP | 2010-9280 A | 1/2010 |
| JP | 2010-86070 A | 4/2010 |
| JP | 2010-198260 A | 9/2010 |
| JP | 2011-35721 A | 2/2011 |
| JP | 2013-29992 A | 2/2013 |
| JP | 2013-45289 A | 3/2013 |
| JP | 2018-129585 A | 8/2018 |
| JP | 2019-67282 A | 4/2019 |
| JP | 2020-61121 A | 4/2020 |
| JP | 2020-95504 A | 6/2020 |
| JP | 2002-310680 A | 10/2022 |
| WO | WO 2008/114435 A1 | 9/2008 |
| WO | WO 2014/157367 A1 | 10/2014 |
| WO | WO 2017/141375 A1 | 8/2017 |
| WO | WO 2019/146522 A1 | 8/2019 |

OTHER PUBLICATIONS

Office Action issued in Japanese Patent Application No. 2021-534124, dated Jan. 25, 2022.

Office Action issued in Japanese Patent Application No. 2021-534124, dated Oct. 19, 2021.

German Office Action for German Application No. 11 2021 006 201.8, dated Apr. 23, 2024, with English translation.

\* cited by examiner

Fig. 7

| TIME SLOT \ MONITORING TARGET AREA | 1 | 2 | 3 | ... | N-1 | N |
|---|---|---|---|---|---|---|
| ... | ... | ... | ... | ... | ... | ... |
| 8:00 – 8:10 | 1 | 2 | 1 | ... | 5 | 4 |
| 8:10 – 8:20 | 0 | 5 | 4 | ... | 1 | 1 |
| ... | ... | ... | ... | ... | ... | ... |
| 12:00 – 12:10 | 3 | 7 | 1 | ... | 3 | 2 |
| ... | ... | ... | ... | ... | ... | ... |

FOR EACH DAY OF WEEK, ETC.

Fig. 8

| TIME SLOT \ MONITORING TARGET AREA | 1 | 2 | 3 | ... | N-1 | N |
|---|---|---|---|---|---|---|
| ... | ... | ... | ... | ... | ... | ... |
| 8:00 – 8:10 | 5% | 10% | 5% | ... | 25% | 20% |
| 8:10 – 8:20 | 0% | 25% | 20% | ... | 5% | 5% |
| ... | ... | ... | ... | ... | ... | ... |
| 12:00 – 12:10 | 15% | 35% | 5% | ... | 15% | 10% |
| ... | ... | ... | ... | ... | ... | ... |

FOR EACH DAY OF WEEK, ETC.

Fig. 12

| TIME SLOT | MONITORING TARGET AREA | 1 | 2 | 3 | ... | N-1 | N |
|---|---|---|---|---|---|---|---|
| FOR EACH DAY OF WEEK, ETC. | 8:00 – 8:10 | 1 | 2 | 1 | ... | ... | ... |
| | 8:10 – 8:20 | 0 | 5 | 4 | ... | 5 | 4 |
| | ... | ... | ... | ... | ... | 1 | 1 |
| | 12:00 – 12:10 | 3 → 2 | 7 → 6 | 1 | ... | ACCIDENT OCCURRED 3 → 7 | 2 → 1 |
| | ... | ... | ... | ... | ... | ... | ... |

Fig. 13

| TIME SLOT (FOR EACH DAY OF WEEK, ETC.) \ MONITORING TARGET AREA | 1 | 2 | 3 | ... | N-1 | N |
|---|---|---|---|---|---|---|
| ... | ... | ... | ... | ... | ... | ... |
| 8:00 – 8:10 | 5% | 10% | 5% | ... | 25% | 20% |
| 8:10 – 8:20 | 0% | 25% | 20% | ... | 5% | 5% |
| ... | ... | ... | ... | ... | ... | ... |
| 12:00 – 12:10 | 15% → 10% | 35% → 30% | 5% | ... | ACCIDENT OCCURRED 15% → 35% | 10% → 5% |
| ... | ... | ... | ... | ... | ... | ... |

Fig. 17

| 5QI VALUE | PACKET DELAY AMOUNT (DELAY UPPER LIMIT) | PACKET ERROR RATE | DEFAULT MAXIMUM DATA BURST SIZE |
|---|---|---|---|
| 1 | 100 MILLISECONDS | $10^{-2}$ | ... |
| 2 | 150 MILLISECONDS | $10^{-3}$ | ... |
| 3 | 200 MILLISECONDS | $10^{-3}$ | ... |
| 4 | 250 MILLISECONDS | $10^{-6}$ | ... |
| ... | ... | ... | ... |

COMMUNICATION RESOURCE ALLOCATION DEVICE, COMMUNICATION RESOURCE ALLOCATION METHOD, AND COMPUTER READABLE MEDIUM

CROSS REFERENCE TO RELATED APPLICATIONS

This application is a Continuation of PCT International Application No. PCT/JP2021/004090, filed on Feb. 4, 2021, which is hereby expressly incorporated by reference into the present application.

TECHNICAL FIELD

The present disclosure relates to a technology to allocate communication resources in a communication system that communicates with vehicles and so on.

BACKGROUND ART

A system has been proposed in which sensor data acquired by infrastructure sensors such as monitoring cameras mounted in roadside devices installed on roadsides is transmitted to a management server by wireless communication so as to be analyzed and used for driving assistance. A system has also been proposed in which sensor data acquired by sensors mounted in vehicles such as automobiles and motorcycles, sensors mounted in smartphones owned by pedestrians, and so on is transmitted to a management server by wireless communication so as to be analyzed and used for driving assistance.

A sensor mounted in a vehicle or the like can acquire information within the detection range of the sensor, but cannot acquire information beyond the detection range of the sensor. Therefore, it is desirable that sensor data acquired by sensors of a plurality of vehicles be analyzed in combination and used for driving assistance. Furthermore, it is desirable that sensor data acquired by infrastructure sensors be analyzed in combination and used for driving assistance.

When driving assistance information is generated and provided based on sensor data transmitted to the management server, a technology called a dynamic map is being studied in which results of analyzing sensor data acquired by various sensors are integrated with a road map so as to generate map information indicating traffic conditions.

It is desirable that the frequency of updating and distributing map information be changed depending on the traffic conditions and so on at each place. It is also desirable that the information amount of map information be changed depending on the traffic conditions and so on at each place.

For example, for an area in a state that needs to be monitored, such as a hazardous state with a high possibility of occurrence of an accident, it is desirable that a large amount of sensor data be promptly acquired so as to reflect the traffic conditions in the map information. In order to realize this, it is necessary to collect a large amount of sensor data from vehicles and so on at short intervals and distribute map information with a large amount of information to the vehicles and so on at short intervals for the area in the state that needs to be monitored. Therefore, the area in the state that needs to be monitored requires a large amount of communication resources.

In reality, it is difficult to allocate a large amount of communication resources to all areas. Therefore, it is necessary to allocate a larger amount of communication resources to the area in the condition that needs to be monitored than those allocated to other areas.

Patent Literature 1 describes an information collection device that generates and provides driving assistance information based on sensor data. The information collection device identifies vehicles and pedestrians with high hazard levels based on the sensor data, and sets monitoring target areas centered on the vehicles and pedestrians with high hazard levels. Then, the information collection device preferentially performs communication of sensor data with a high level of urgency for the monitoring target areas.

CITATION LIST

Patent Literature

Patent Literature 1: JP 2020-95504 A

SUMMARY OF INVENTION

Technical Problem

It is assumed that cellular communication such as 5G (generation) is used for communication. The coverage area of one base station in cellular communication is considered to extend typically to several kilometers. Therefore, in order to constantly monitor vehicles and pedestrians to specify areas to be monitored in real time, as in the information collection device described in Patent Literature 1, just specifying the areas to be monitored within the coverage area of one base station requires a large amount of communication resources. In addition, areas that needs to be monitored may arise at a plurality of places at the same time within the coverage area of one base station. Even if it is desired to allocate communication resources preferentially to the areas to be monitored that have arisen at the same time, limited communication resources of one base station may result in a shortage of communication resources, making allocation difficult.

An object of the present disclosure is to make it possible to appropriately allocate communication resources without using a large amount of communication resources.

Solution to Problem

A communication resource allocation device according to the present disclosure includes a hazard level determination unit to identify a hazardous behavior that has occurred in a past reference period in each of monitoring target areas included in a communication area, the hazardous behavior being a behavior that may cause a traffic accident, so as to determine a hazard level for each of the monitoring target areas; and a communication resource allocation unit to allocate a communication resource to each of the monitoring target areas based on the hazard level determined by the hazard level determination unit.

Advantageous Effects of Invention

In the present disclosure, a hazard level of each of monitoring target areas is determined based on hazardous behaviors that have occurred in a past reference period, and communication resources are allocated based on the hazard level. As a result, it is not necessary to specify an area to be monitored in real time, so that communication resources can be appropriately allocated without using a large amount of communication resources.

BRIEF DESCRIPTION OF DRAWINGS

FIG. 7 is a figure illustrating a hazard level table according to Embodiment 1;
FIG. 8 is a figure illustrating an allocation table according to Embodiment 1;
FIG. 12 is a figure illustrating a hazard level table according to Embodiment 2;
FIG. 13 is a figure illustrating an allocation table according to Embodiment 2;
FIG. 17 is a figure describing 5QI values according to Embodiment 4.

DESCRIPTION OF EMBODIMENTS

Embodiment 1

*Description of Configuration*

Figure 1:
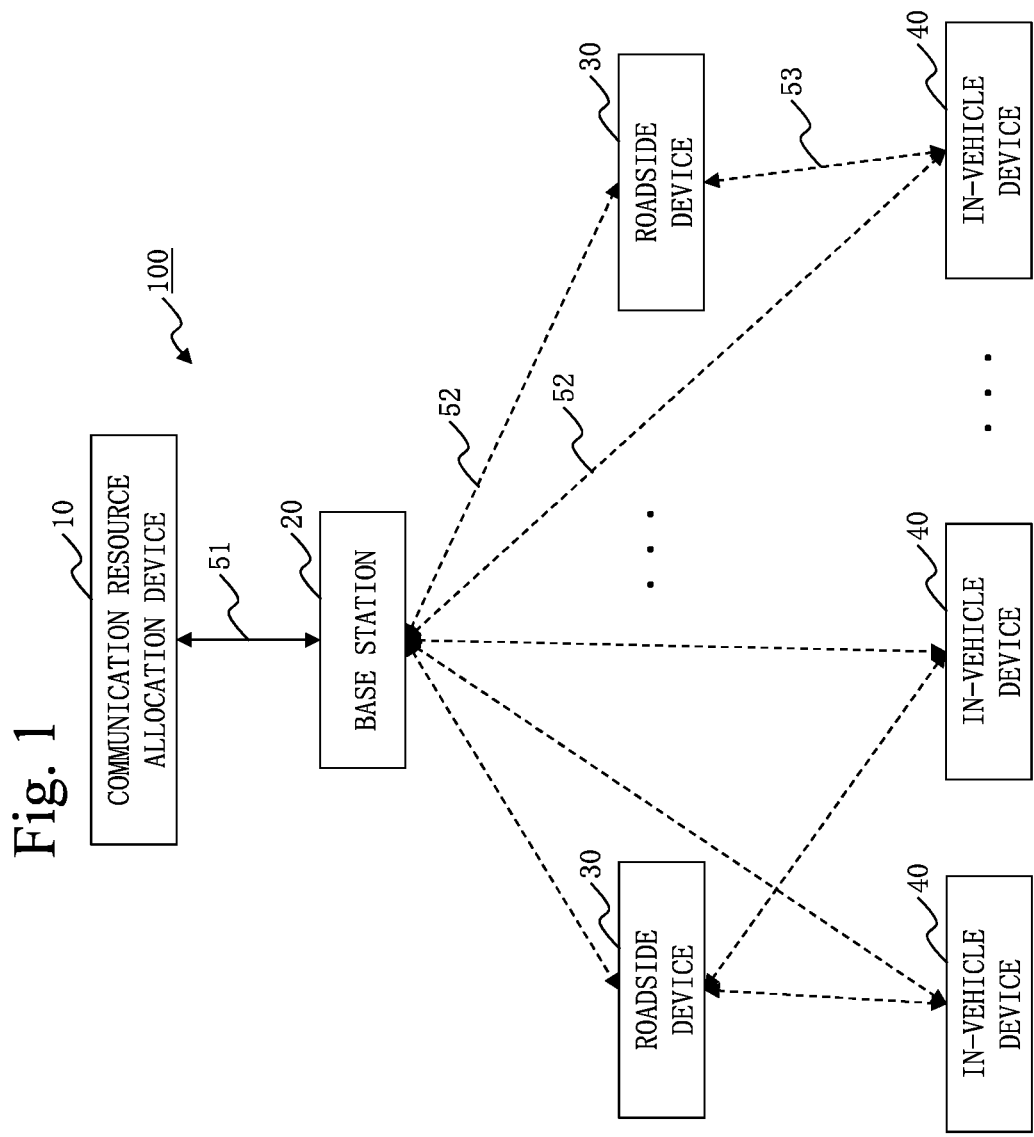
FIG. 1 is a configuration diagram of a communication system 100 according to Embodiment 1.

Referring to FIG. 1, a configuration of a communication system 100 according to Embodiment 1 will be described.

The communication system 100 includes a communication resource allocation device 10, a base station 20, at least one roadside device 30, and at least one in-vehicle device 40.

The communication resource allocation device 10 and the base station 20 are connected through a wired communication channel 51. The base station 20 and each roadside device 30 are connected through a wireless communication channel 52. Each roadside device 30 is connected with the in-vehicle device 40 that is located within a communication range through a wireless communication channel 53. Each in-vehicle device 40 may be connected with the base station 20 through the wireless communication channel 52.

In Embodiment 1, it is assumed that the wireless communication channel 52 is a network of cellular communication such as 5G.

In FIG. 1, only one base station 20 is illustrated, but the communication system 100 may include a plurality of base stations 20. The communication system 100 may include a plurality of communication resource allocation devices 10, and may be configured to allow communication between the communication resource allocation devices 10.

Figure 2:
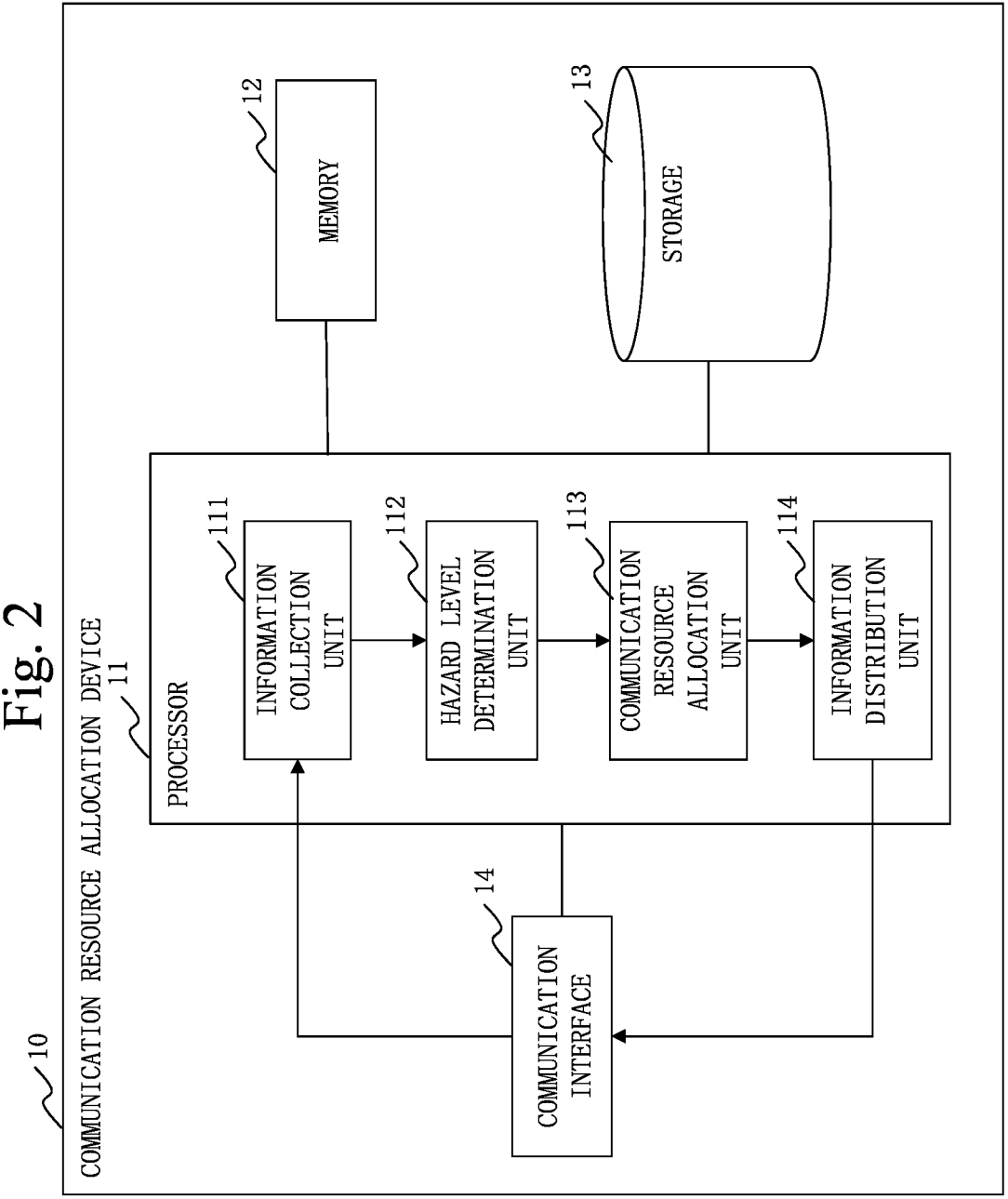
FIG. 2 is a configuration diagram of a communication resource allocation device 10 according to Embodiment 1.

Referring to FIG. 2, a configuration of the communication resource allocation device 10 according to Embodiment 1 will be described.

The communication resource allocation device 10 is a computer such as a server.

The communication resource allocation device 10 includes hardware of a processor 11, a memory 12, a storage 13, and a communication interface 14. The processor 11 is connected with other hardware components through signal lines, and controls these other hardware components.

The communication resource allocation device 10 includes, as functional components, an information collection unit 111, a hazard level determination unit 112, a communication resource allocation unit 113, and an information distribution unit 114. The functions of the functional components of the communication resource allocation device 10 are realized by software.

The storage 13 stores programs that realize the functions of the functional components of the communication resource allocation device 10. These programs are loaded into the memory 12 by the processor 11 and executed by the processor 11. This realizes the functions of the functional components of the communication resource allocation device 10.

Figure 3:
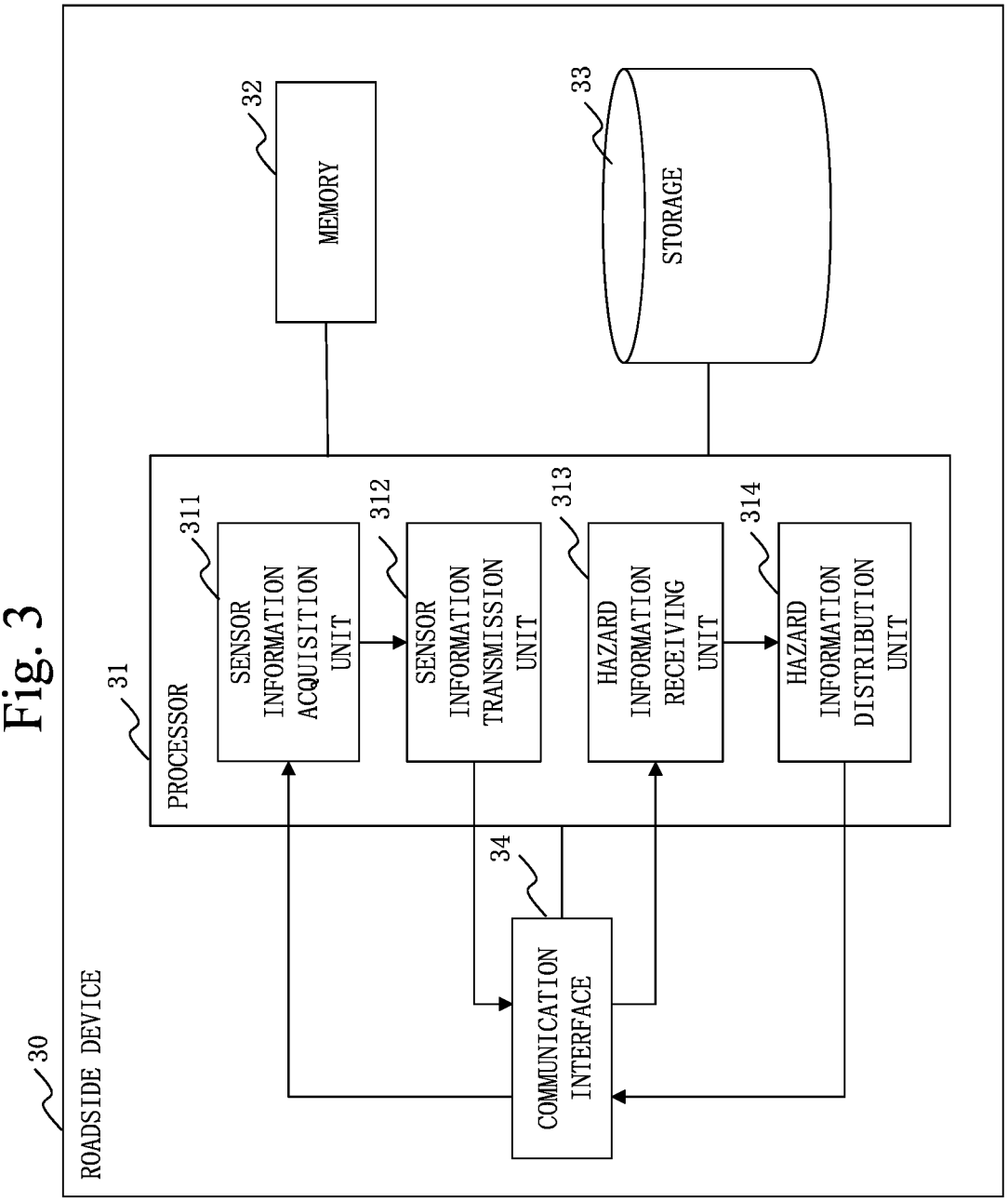
FIG. 3 is a configuration diagram of a roadside device 30 according to Embodiment 1.

Referring to FIG. 3, a configuration of the roadside device 30 according to Embodiment 1 will be described.

The roadside device 30 is a computer that is installed on a roadside near an intersection.

The roadside device 30 includes hardware of a processor 31, a memory 32, a storage 33, and a communication interface 34. The processor 31 is connected with other hardware components through signal lines, and controls these other hardware components.

The roadside device 30 includes, as functional components, a sensor information acquisition unit 311, a sensor information transmission unit 312, a hazard information receiving unit 313, and a hazard information distribution unit 314. The functions of the functional components of the roadside device 30 are realized by software.

The storage 33 stores programs that realize the functions of the functional components of the roadside device 30. These programs are loaded into the memory 32 by the processor 31 and executed by the processor 31. This realizes the functions of the functional components of the roadside device 30.

Figure 4:
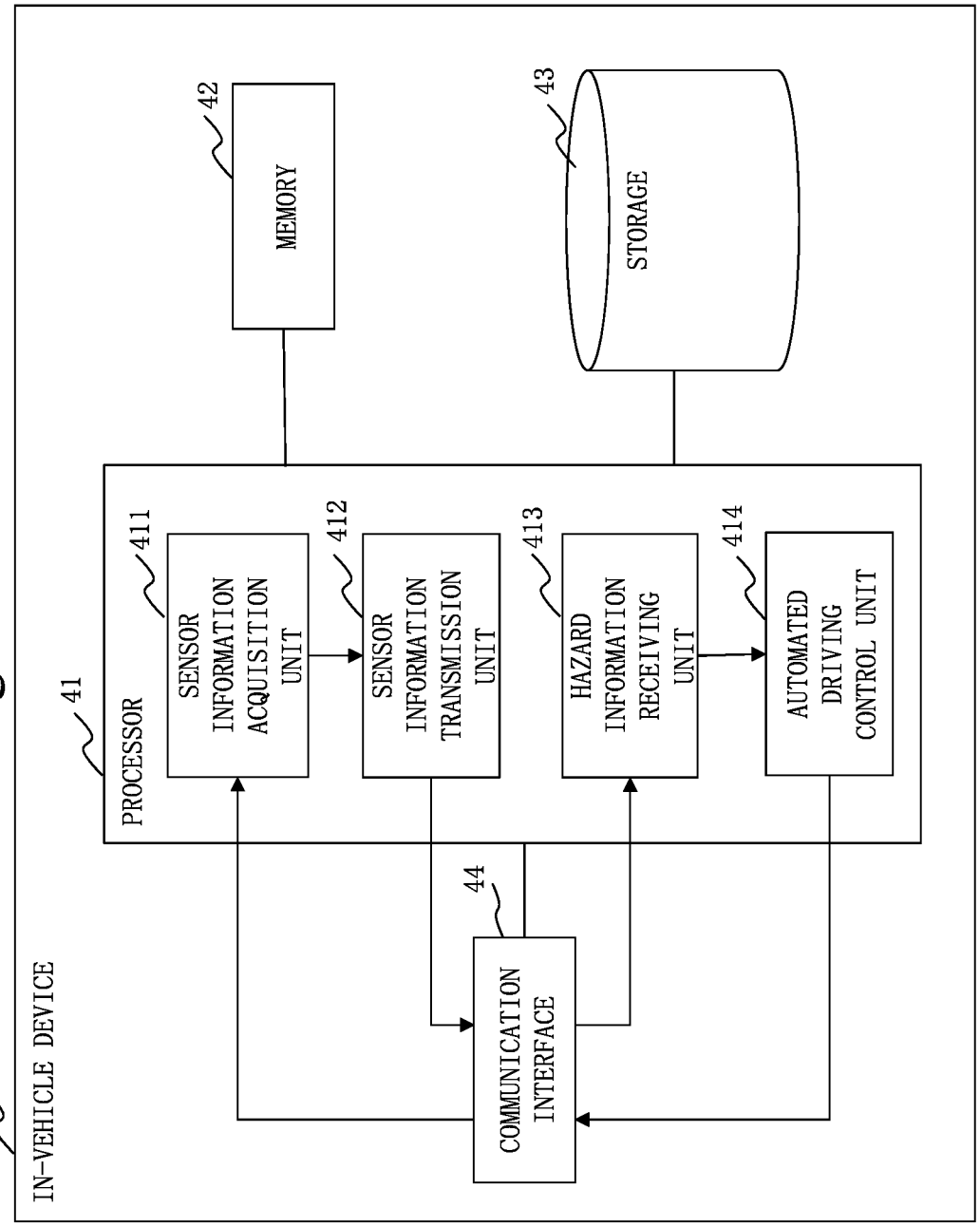
FIG. 4 is a configuration diagram of an in-vehicle device 40 according to Embodiment 1.

Referring to FIG. 4, a configuration of the in-vehicle device 40 according to Embodiment 1 will be described.

The in-vehicle device 40 is a computer that is installed on a roadside near an intersection.

The in-vehicle device 40 includes hardware of a processor 41, a memory 42, a storage 43, and a communication interface 44. The processor 41 is connected with other hardware components through signal lines, and controls these other hardware components.

The in-vehicle device 40 includes, as functional components, a sensor information acquisition unit 411, a sensor information transmission unit 412, a hazard information receiving unit 413, and an automated driving control unit 414. The functions of the functional components of the in-vehicle device 40 are realized by software.

The storage 43 stores programs that realize the functions of the functional components of the in-vehicle device 40. These programs are loaded into the memory 42 by the processor 41 and executed by the processor 41. This realizes the functions of the functional components of the in-vehicle device 40.

Each of the processors 11, 31, and 41 is an integrated circuit (IC) that performs processing. Specific examples of each of the processors 11, 31, and 41 are a central processing unit (CPU), a digital signal processor (DSP), and a graphics processing unit (GPU).

Each of the memories 12, 32, and 42 is a storage device to temporarily store data. Specific examples of each of the memories 12, 32, and 42 are a static random access memory (SRAM) and a dynamic random access memory (DRAM).

Each of the storages 13, 33, and 43 is a storage device to store data. A specific example of each of the storages 13, 33, and 43 is a hard disk drive (HDD). Alternatively, each of the storages 13, 33, and 43 may be a portable recording medium such as a Secure Digital (SD, registered trademark) memory card, CompactFlash (CF, registered trademark), a NAND flash, a flexible disk, an optical disc, a compact disc, a Blu-ray (registered trademark) disc, and a digital versatile disc (DVD).

Each of the communication interfaces 14, 34, and 44 is an interface for communicating with external devices. A specific example of each of the communication interfaces 14, 34, and 44 is a communication device for cellular communication.

In FIG. 2, only one processor 11 is illustrated. However, there may be a plurality of processors 11, and the plurality of processors 11 may cooperatively execute the programs that realize the functions. Similarly, there may be a plurality of processors 31 and a plurality of processors 41, and the plurality of processors 31 may cooperatively execute the programs that realize the functions and the plurality of processors 41 may cooperatively execute the programs that realize the functions.

\*\*\*Description of Operation\*\*\*

Referring to FIGS. 5 to 8, operation of the communication resource allocation device 10 according to Embodiment 1 will be described.

A procedure for the operation of the communication resource allocation device according to Embodiment 1 is equivalent to a communication resource allocation method according to Embodiment 1. A program that realizes the operation of the communication resource allocation device 10 according to Embodiment 1 is equivalent to a communication resource allocation program according to Embodiment 1.

The operation of the communication resource allocation device 10 according to Embodiment 1 includes a preliminary setting process and a main process.

Figure 5:
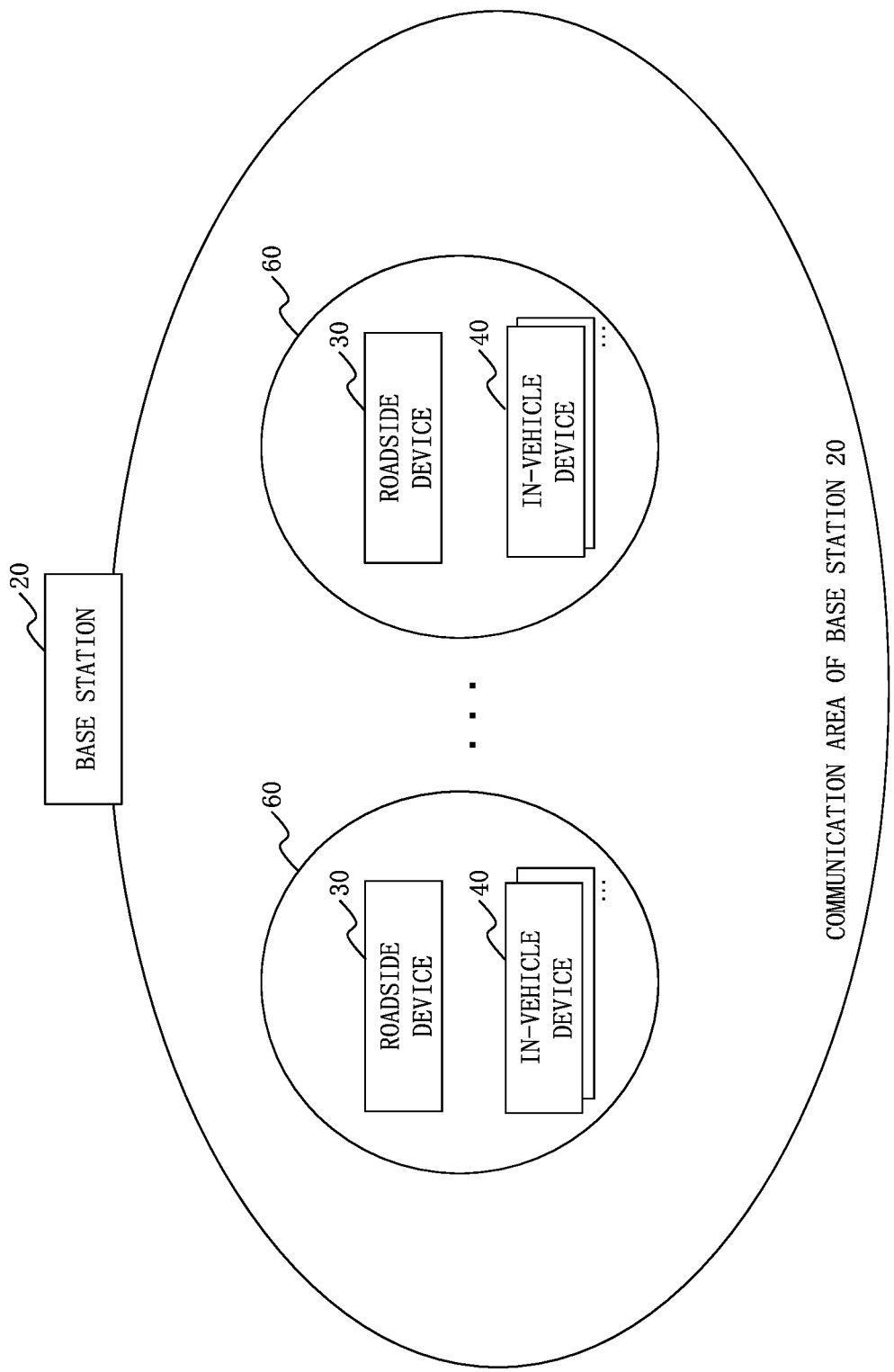
FIG. 5 is a figure describing a preliminary setting process according to Embodiment 1.

Referring to FIG. 5, the preliminary setting process according to Embodiment 1 will be described.

In the preliminary setting process, a monitoring target area 60, which is an area to be monitored, is set within a communication area of the base station 20. In Embodiment 1, an area of a reference range centered on the intersection where each roadside device 30 is installed is set as the monitoring target area 60. The monitoring target area 60 is set in this way because the intersection where the roadside device 30 is installed is considered to be an area with a risk of occurrence of a traffic accident that needs to be monitored.

Specifically, the information collection unit 111 treats each roadside device 30 as a target, and acquires location information indicating the location of the target roadside device 30 from the target roadside device 30. The hazard level determination unit 112 refers to map information and identifies an intersection nearest to the location indicated by the location information, and sets the reference range centered on the identified intersection as the monitoring target area 60.

Alternatively, the information collection unit 111 acquires intersection information indicating an intersection that is input by an administrator or the like of the communication resource allocation device 10. The hazard level determination unit 112 sets the reference range centered on the intersection indicated by the intersection information as the monitoring target area 60.

An area centered on an intersection where a device, other than the roadside device 30, in which an infrastructure sensor is mounted may also be set as the monitoring target area 60.

Figure 6:
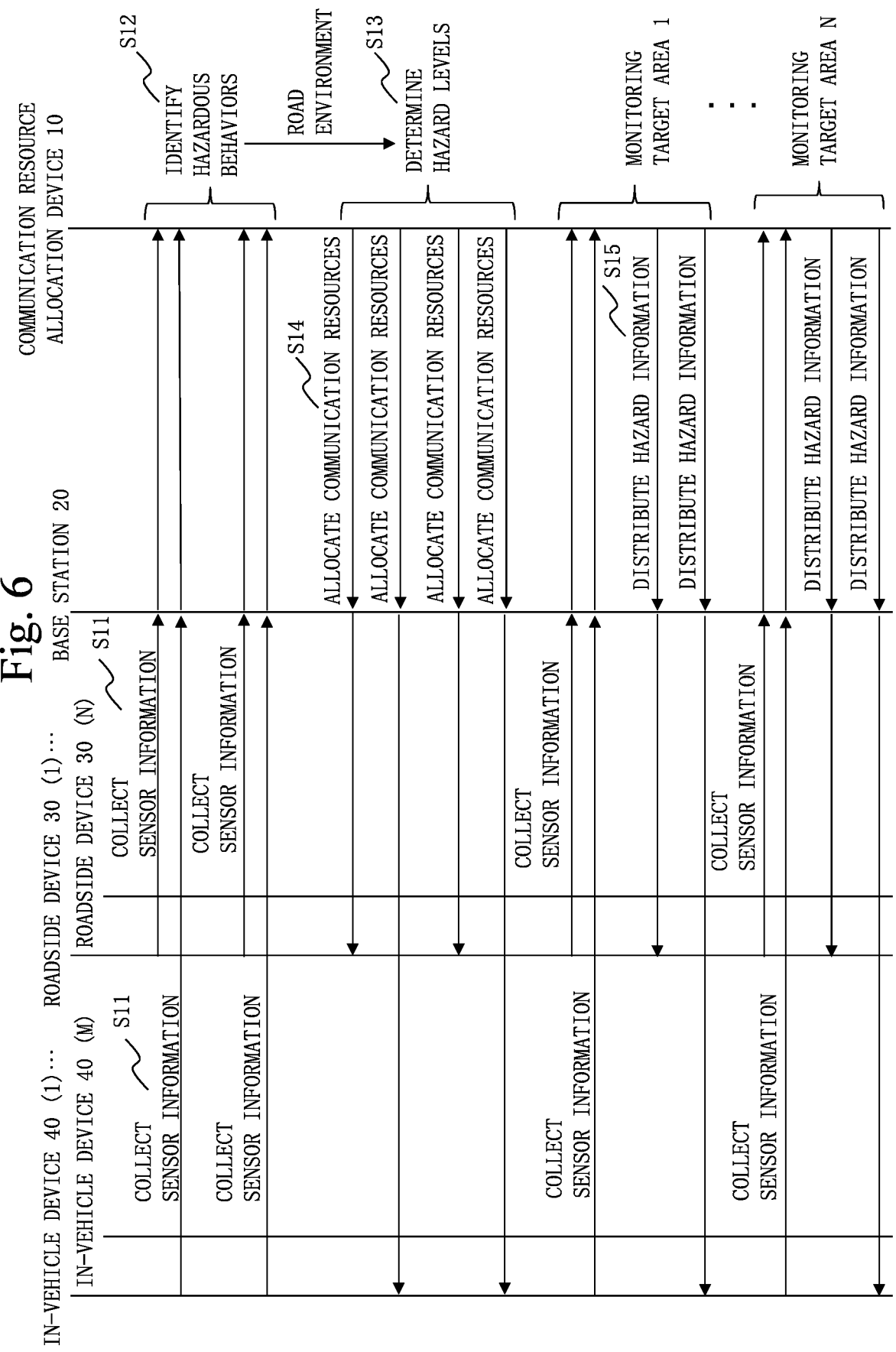
FIG. 6 is a processing flowchart of a main process according to Embodiment 1.

Referring to FIG. 6, the main process according to Embodiment 1 will be described.

(Step S11: Information Collection Process)

The information collection unit 111 collects sensor information acquired by sensors that are present in the communication area of the base station 20. At this time, the information collection unit 111 collects sensor information acquired by sensors that are present in each of a plurality of monitoring target areas 60, using communication resources allocated in step S14 to be described later.

Specifically, the information collection unit 111 receives, via the base station 20, sensor information acquired by the sensors mounted in each roadside device 30 and each in-vehicle device 40. That is, the information collection unit 111 receives sensor information acquired by the sensor information acquisition unit 311 and transmitted by the sensor information transmission unit 312 of the roadside device 30, and receives sensor information acquired by the sensor information acquisition unit 411 and transmitted by the sensor information transmission unit 412 of the in-vehicle device 40. The information collection unit 111 writes the received sensor information in the storage 13.

Sensor information is information such as image data acquired by a camera mounted in the roadside device 30 or a camera mounted in the in-vehicle device 40 and point cloud information indicating the location and luminance of each reflection point acquired by an optical sensor mounted in the in-vehicle device 40. In addition, sensor information may include positioning signals received by a positioning signal receiver such as a Global Positioning System (GPS) signal receiver mounted in the in-vehicle device 40. Sensor information may also include information acquired by sensors such as a vehicle speed sensor, a brake depression sensor, and an acceleration sensor mounted in the in-vehicle device 40. The camera mounted in the in-vehicle device 40 may be a camera that captures images only in the traveling direction of the in-vehicle device 40 or a camera that captures images in all directions.

(Step S12: Hazardous Behavior Identification Process)

The hazard level determination unit 112 identifies a hazardous behavior that has occurred in each of the monitoring target areas 60 and may cause a traffic accident based on the sensor information collected in step S11.

Specifically, the hazard level determination unit 112 reads out, from the storage 13, sensor information acquired at times up to slightly earlier than the current time. The hazard level determination unit 112 sets each of the monitoring target areas 60 as a target area. The hazard level determination unit 112 identifies behaviors of vehicles and pedestrians that are present in the target area based on the sensor information that has been read out. Various methods can be used as a behavior identification method, such as a method using pattern matching and a method using a detection model using deep learning. The hazard level determination unit 112 extracts a behavior that constitutes a hazardous behavior from the identified behaviors. The hazard level determination unit 112 writes the extracted hazardous behavior in the storage 13 together with location information indicating an occurrence location, which is the location of the vehicle or pedestrian that has performed this behavior, and a current time, which is the time at which this behavior has occurred.

For example, hazardous behaviors concerning vehicles include behaviors such as ignoring traffic lights, starting suddenly, accelerating suddenly, decelerating suddenly, and changing lanes suddenly. Hazardous behaviors concerning pedestrians include behaviors such as walking while looking at a smartphone, book, or the like and ignoring traffic lights.

(Step S13: Hazard Level Determination Process)

The hazard level determination unit 112 determines a hazard level for each of the monitoring target areas 60 based on hazardous behaviors that have occurred in each of the monitoring target areas 60 in a past reference period.

Specifically, the hazard level determination unit 112 reads out each hazardous behavior whose occurrence time is within the past reference period from the storage 13. The hazard level determination unit 112 treats each hazardous behavior that has been read out as a target behavior, and associates identification information, indicating description of the target behavior, and the occurrence time of the target behavior with the occurrence location indicated by the location information of the target behavior in the map information. The hazard level determination unit 112 sets each of the monitoring target areas 60 as a target area. The hazard level determination unit 112 refers to the map information, and identifies each hazardous behavior associated with the target area. The hazard level determination unit 112 determines a hazard level for the target area based on each identified hazardous behavior. For example, a score is set for identification information of each hazardous behavior, and a hazard level is decided based on a statistical value such as a total value of scores of hazardous behaviors associated with the target area. The hazard level determination unit 112 writes the hazard level determined for the target area in the storage 13.

That is, the hazard level determination unit 112 accumulates hazardous behaviors of vehicles and pedestrians observed in real time. Then, the hazard level determination unit 112 measures hazardous behaviors that have occurred in the past reference period as statistical information and determines a hazard level.

In Embodiment 1, the hazard level determination unit 112 determines a hazard level for each of the monitoring target areas 60 for each time slot by identifying hazardous behaviors that have occurred in each of the monitoring target areas 60 for each time slot. That is, the hazard level determination unit 112 treats each time slot as a target time slot, and refers to the map information and identifies each hazardous behavior that has an occurrence time included in the target time slot and is associated with the target area. The hazard level determination unit 112 determines a hazard level for the target area in the target time slot based on the identified hazardous behaviors.

The hazard level determination unit 112 writes the hazard level determined for the target area in the target time slot in the storage 13. Specifically, the hazard level determination unit 112 generates a hazard level table indicating hazard levels for each time slot and each of the monitoring target areas 60, as illustrated in FIG. 7, and writes it in the storage 13.

The hazard level determination unit 112 may determine a hazard level, taking into consideration a road environment related to occurrence of traffic accidents in addition to hazardous behaviors that have occurred in the past reference period, for each of the monitoring target areas 60.

The road environment related to occurrence of traffic accidents indicates indices such as the shape of a road, presence or absence of a bridge, presence or absence of facilities such as a school and a specific shop around the road, specific situations that occur depending on the season, day of the week, time slot, weather, and circumstances particular to the road, and service routes and locations of stations in urban transportation or the like. The specific situations indicate information such as visibility conditions of the road, presence or absence of ice, vehicle traffic volume, and pedestrian traffic volume. In urban transportation or the like, service routes are determined in principle. Even at the same intersection, there are differences such as turning right, turning left, and moving straight depending on the service route, and these differences affect occurrence of traffic accidents. At stations in urban transportation or the like, vehicles stop and start, so that the locations of stations affect occurrence of traffic accidents. In addition to urban transportation, service routes may also be restricted at a port or parking area. Depending on the service route at a port or parking area, differences occur in loading and unloading of goods and driving conditions such as making a vehicle turn, and these differences affect occurrence of traffic accidents.

For a hazardous behavior after which a certain amount of time has passed, the hazard level determination unit 112 may reduce its influence on a hazard level. For example, the hazard level determination unit 112 determines a hazard level by weighting influences so that an earlier occurrence time point has a smaller influence and then calculating a statistical value of scores. As a result, it is possible to determine a hazard level based on hazardous behaviors that have occurred in the past reference period, and also determine a hazard level that appropriately reflects changes in the road, surrounding environment, and so on.

If the communication resource allocation device 10 is in an early stage of operation and thus hazardous behaviors that have occurred in the past have not been accumulated sufficiently, the hazard level determination unit 112 may determine a hazard level based only on accumulated hazardous behaviors and may gradually accumulate hazardous behaviors.

(Step S14: Communication Resource Allocation Process)

The communication resource allocation unit 113 allocates communication resources to each of the monitoring target areas 60 for each time slot based on the hazard level determined in step S13.

Specifically, the communication resource allocation unit 113 refers to the hazard level table, and allocates communication resources to each of the monitoring target areas 60 so that the sum of communication resources allocated to all the monitoring target areas 60 is equal to or smaller than the entire communication resources of the base station 20 in each time slot. If communication resources also need to be allocated to an area not set as the monitoring target area 60 within the communication area of the base station 20, the communication resource allocation unit 113 allocates less communication resources to the area not set as the monitoring target area 60 than those allocated to the monitoring target areas 60. In this case, the communication resource allocation unit 113 decides allocation so that the sum of allocated communication resources, including those allocated to the area not set as the monitoring target area 60, is equal to or smaller than the entire communication resources of the base station 20.

The communication resource allocation unit 113 writes the amount of communication resources for each of the monitoring target areas 60 in each time slot in the storage 13. Specifically, the communication resource allocation unit 113 generates an allocation table indicating the amount of communication resources allocated to each of the monitoring target areas 60 in each time slot, as illustrated in FIG. 8, and writes it in the storage 13.

For example, the communication resource allocation unit 113 allocates communication resources to each of the monitoring target areas 60 so that the sum of communication resources allocated to all the monitoring target areas 60 is the entire communication resources of the base station 20. Alternatively, the communication resource allocation unit 113 sets aside part (for example, 10%) of the entire communication resources of the base station 20 for emergencies, and then allocates communication resources to each of the monitoring target areas 60 so that the sum of communication resources allocated to all of the monitoring target areas 60 is the remaining amount of communication resources (90% in the above example). That is, the communication resource allocation unit 113 allocates the entire communication resources of the base station 20 or the remaining communication resources after part is set aside to each of the monitoring target areas 60 according to the hazard level of each of the monitoring target areas 60.

As a method for allocating communication resources, there is a method of shortening intervals of communication with devices in the monitoring target area 60 with a high hazard level, and lengthening intervals of communication with devices in the monitoring target area 60 with a low hazard level. That is, the communication resource allocation unit 113 shortens intervals at which sensor information is collected from devices present in the monitoring target area 60 with a high hazard level and intervals at which hazard information is distributed to devices present in the monitoring target area 60 with a high hazard level. The communication resource allocation unit 113 lengthens intervals at which sensor information is collected from devices present in the monitoring target area 60 with a low hazard level and intervals at which hazard information is distributed to devices present in the monitoring target area 60 with a low hazard level.

As a method for allocating communication resources, there is a method of increasing a data size for communication with devices present in the monitoring target area 60 with a high hazard level, and reducing a data size for communication with devices present in the monitoring target area 60 with a low hazard level. That is, the communication resource allocation unit 113 increases the size of sensor information collected from devices present in the monitoring target area 60 with a high hazard level and the size of hazard information distributed to devices present in the monitoring target area 60 with a high hazard level. The communication resource allocation unit 113 decreases the size of sensor information collected from devices present in the monitoring target area 60 with a low hazard level and the size of hazard information distributed to devices present in the monitoring target area 60 with a low hazard level.

For example, when sensor information is image data, increasing the size means enhancing at least one of image quality and rate, and decreasing the size means reducing at least one of image quality and rate. When hazard information is map information, increasing the size means increasing the amount of data to be added, and decreasing the size means reducing the amount of data to be added.

As a method for allocating communication resources, there is a method of changing allocation of communication resources related to the data communication speed specified by a communication method that is used. The communication resources specified by the communication method that is used are, for example, time slots that are divisions of a time axis in the time division multiple access (TDMA) method. The communication resources specified by the communication method that is used may be frequency slots that are divisions of a frequency axis in the frequency division multiple access (FDMA) method. Alternatively, the communication resources specified by the communication method that is used may be modulation methods such as binary phase shift keying (BPSKquadrature phase shift keying (QPSK), 16-quadrature amplitude modulation (QAM), 64-QAM, and 256-QAM. In addition, the communication resources specified by the communication method that is used may be resource blocks in the orthogonal frequency division multiple access (OFDMA) method. Resource blocks are blocks resulting from dividing both the frequency axis and the time axis. The communication resource allocation unit 113 allocates communication resources so that communication with devices present in the monitoring target area 60 with a high hazard level is high-speed data transmission, and allocates communication resources so that communication with devices present in the monitoring target area 60 with a low hazard level is low-speed data transmission.

The devices present in the monitoring target area 60 are the roadside device 30 installed in the monitoring target area 60 and the in-vehicle device 40 present in the monitoring target area 60.

(Step S15: Information Distribution Process)

The information distribution unit 114 distributes information to the devices present in each of the monitoring target areas 60, using the communication resources allocated in step S14.

Specifically, the information distribution unit 114 sets each of the monitoring target areas 60 as a target area. The information distribution unit 114 refers to the allocation table, and identifies an allocation amount of communication resources for the target area at the current time. The information distribution unit 114 distributes information to the devices present in the target area, using the communication resources of the identified allocation amount. The devices present in the target area are the roadside device 30 installed in the target area and the in-vehicle device 40 present in the target area. The information that is distributed is map information or the like that is associated with information indicating hazardous behaviors that have occurred in the target area and recently detected in step S12 and also indicating the locations of nearby vehicles and pedestrians.

Hazard information may be distributed to the monitoring target areas 60 by broadcasting or multicasting, or may be distributed to each roadside device 30 and each in-vehicle device 40 by unicasting.

In the roadside device 30, the hazard information receiving unit 313 receives distributed hazard information, and the hazard information distribution unit 314 distributes the hazard information to the in-vehicle device 40 and so on that are present in the vicinity.

In the in-vehicle device 40, the hazard information receiving unit 413 receives distributed hazard information, and the automated driving control unit 414 performs automated driving control, taking the hazard information into consideration. Automated driving control is to control equipment such as an accelerator, brakes, and steering so as to move the vehicle in which the in-vehicle device 40 is mounted.

Effects of Embodiment 1

As described above, the communication resource allocation device 10 according to Embodiment 1 determines a hazard level for each of the monitoring target areas 60 based on hazardous behaviors that have occurred in the past reference period, and allocates communication resources based on the hazard level. As a result, there is no need to constantly perform monitoring to determine hazard levels in real time and precisely specify areas to be monitored, so that a large amount of communication resources is not used. Therefore, communication resources can be appropriately allocated. Even if hazardous behaviors occur at a plurality of places at the same time, communication resources can be appropriately allocated.

The communication resource allocation device 10 according to Embodiment 1 determines a hazard level, taking into consideration not only hazardous behaviors identified based on sensor information, but also the road environment related to occurrence of traffic accidents. As a result, a hazard level can be determined with high accuracy, and communication resources can be appropriately allocated.

In addition, instead of determining a hazard level for the entire communication area of the base station 20, the communication resource allocation device 10 according to Embodiment 1 determines a hazard level only for each of the monitoring target areas 60 in the communication area. As a result, there is no need to monitor many ranges unnecessarily, and limited communication resources can be effectively utilized.

By realizing appropriate allocation of communication resources, the collection of sensor information from necessary locations and the distribution of hazard information to necessary locations will be sufficiently performed. As a result, traffic accidents can be prevented from occurring and safety can be enhanced.

\*\*\*Other Configurations\*\*\*

<Variation 1>

The communication system 100 may include user terminals such as smartphones owned by pedestrians. When the communication system 100 includes user terminals, the user terminals are connected with the base station 20 through the wireless communication channel 52.

In this case, in step S11 of FIG. 6, sensor information is collected also from the user terminals. In step S15 of FIG. 6, hazard information is distributed also to the user terminals.

<Variation 2>

An area not in the vicinity of the intersection where the roadside device 30 is installed may be set as the monitoring target area 60 if it is an area with a risk of occurrence of a traffic accident. For example, areas that may be set as the monitoring target areas 60 include a place with a high density of vehicles or pedestrians, a place where vehicles gather or separate such as a roadside or an interchange, an intersection where right and left turns are made in service routes in urban transportation or the like, an area around a station in urban transportation or the like, a restricted area such as a port or a parking area, an area where the weather has deteriorated locally due to torrential rain or the like, and an area where a vehicle of urban transportation or the like that is not running on schedule runs.

<Variation 3>

The wireless communication channel 52 is not limited to 5G, and may be a network of a different type of cellular communication such as 4G or may be a network such as dedicated short-range communications (DSRC). Alternatively, the wireless communication channel 52 may be configured by a combination of these networks. Alternatively, the wireless communication channel 52 may be configured using local 5G, which allows a land owner or a business operator or the like commissioned by a land owner to independently build a wireless communication system using 5G.

<Variation 4>

In Embodiment 1, the functional components are realized by software. As Variation 4, however, the functional components may be realized by hardware. With regard to this Variation 4, differences from Embodiment 1 will be described.

Figure 9:
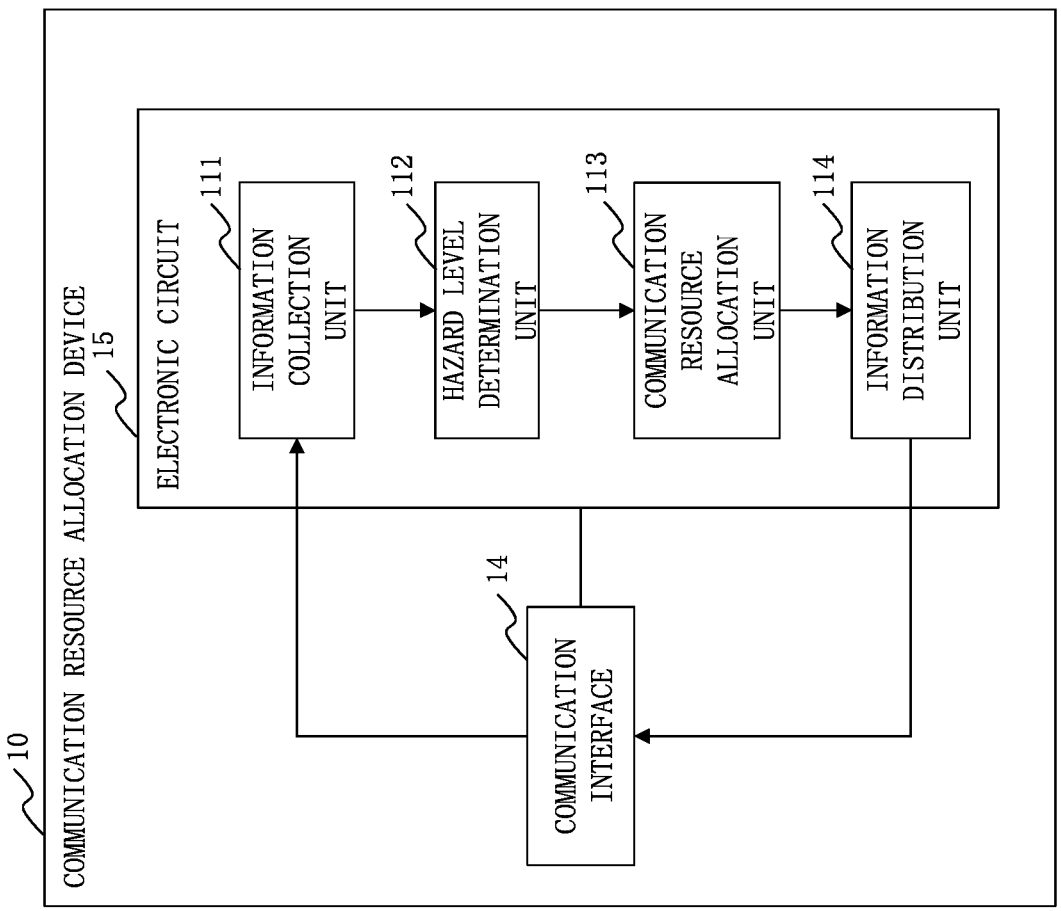
FIG. 9 is a configuration diagram of a communication resource allocation device 10 according to Variation 4.

Referring to FIG. 9, a configuration of the communication resource allocation device 10 according to Variation 4 will be described.

When the functional components are realized by hardware, the communication resource allocation device 10 includes an electronic circuit 15 in place of the processor 11, the memory 12, and the storage 13. The electronic circuit 15 is a dedicated circuit that realizes the functions of the functional components, the memory 12, and the storage 13.

Figure 10:
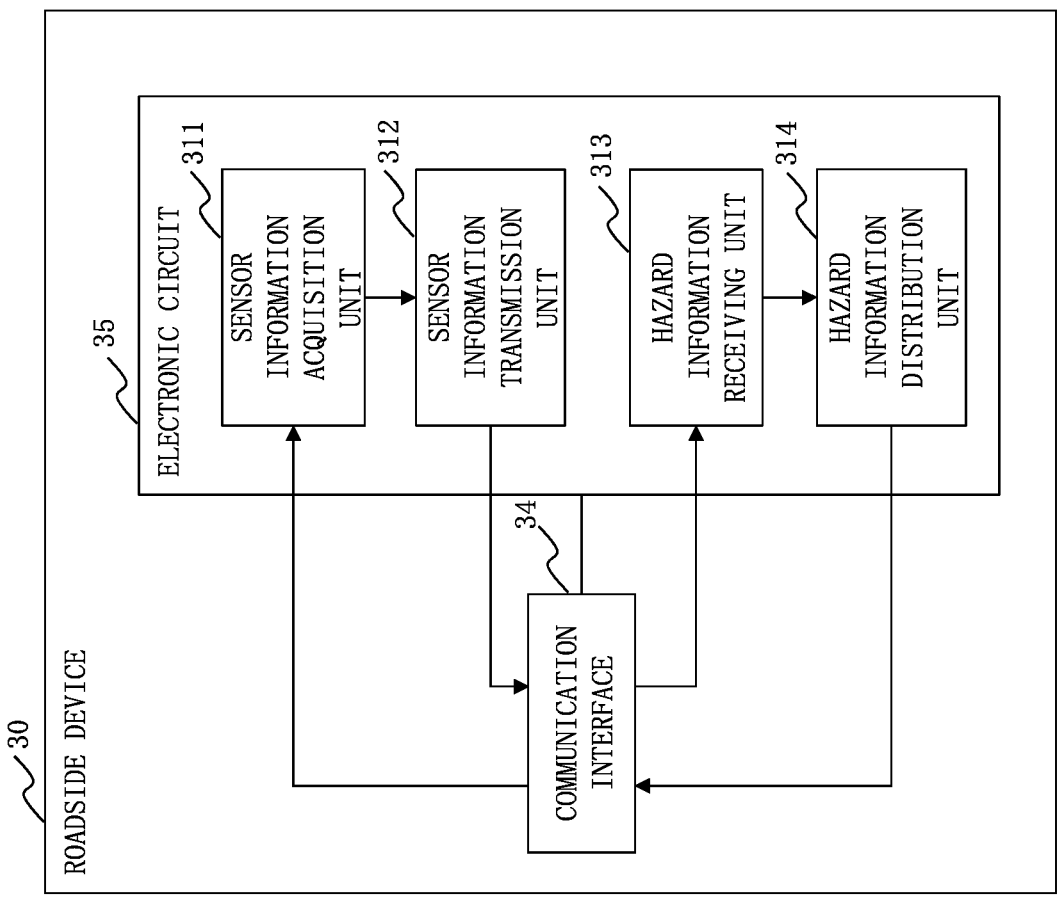
FIG. 10 is a configuration diagram of the roadside device 30 according to Variation 4.

Referring to FIG. 10, a configuration of the roadside device 30 according to Variation 4 will be described.

When the functional components are realized by hardware, the roadside device includes an electronic circuit 35 in place of the processor 31, the memory 32, and the storage 33. The electronic circuit 35 is a dedicated circuit that realizes the functions of the functional components, the memory 32, and the storage 33.

Figure 11:
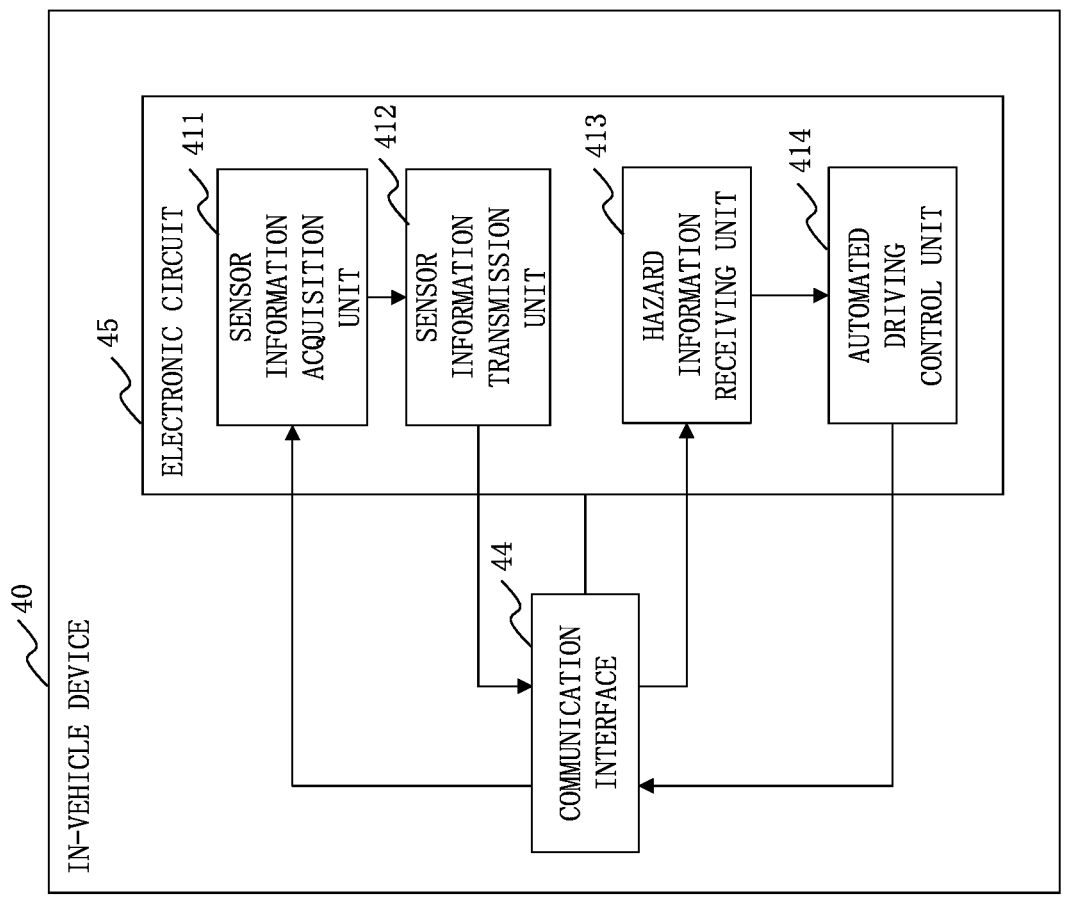
FIG. 11 is a configuration diagram of the in-vehicle device 40 according to Variation 4.

Referring to FIG. 11, a configuration of the in-vehicle device 40 according to Variation 4 will be described.

When the functional components are realized by hardware, the in-vehicle device 40 includes an electronic circuit 45 in place of the processor 41, the memory 42, and the storage 43. The electronic circuit 45 is a dedicated circuit that realizes the functions of the functional components, the memory 42, and the storage 43.

Each of the electronic circuits 15, 35, and 45 is assumed to be a single circuit, a composite circuit, a programmed processor, a parallel-programmed processor, a logic IC, a gate array (GA), an application specific integrated circuit (ASCI), or a field-programmable gate array (FPGA).

The functional components may be realized by one electronic circuit 15, or may be distributed among and realized by a plurality of electronic circuits 15. The functional components may be realized by one electronic circuit 35, or may be distributed among and realized by a plurality of electronic circuits 35. The functional components may be realized by one electronic circuit 45, or may be distributed among and realized by a plurality of electronic circuits 45.

<Variation 5>

As Variation 5, some of the functional components may be realized by hardware, and the rest of the functional components may be realized by software.

Each of the processor 11, the memory 12, the storage 13, and the electronic circuits 15, 35, and 45 is referred to as processing circuitry. That is, the functions of the functional components are realized by the processing circuitry.

Embodiment 2

Embodiment 2 differs from Embodiment 1 in that a hazard level is raised for the monitoring target area 60 where an emergency such a traffic accident has occurred. In Embodiment 2, this difference will be described, and description will be omitted for the same aspects.
\*\*\*Description of Operation\*\*\*

Referring to FIGS. 6, 12, and 13, operation of the communication resource allocation device 10 according to Embodiment 2 will be described.

The process of step S11 and the processes of steps S14 to S15 are the same as those in Embodiment 1.

(Step S12: Hazardous Behavior Identification Process)

The hazard level determination unit 112 identifies hazardous behaviors that have occurred in each of the monitoring target areas 60 based on sensor information collected in step S11, as in Embodiment 1.

The hazard level determination unit 112 also identifies an emergency that has occurred in each of the monitoring target areas 60 based on the sensor information collected in step S11. Specific examples of an emergency are events such as a traffic accident, a fire, and a raptured water pipe.

(Step S13: Hazard Level Determination Process)

The hazard level determination unit 112 determines a hazard level for each of the monitoring target areas 60 based on hazardous behaviors that have occurred in each of the monitoring target areas 60, as in Embodiment 1. However, if occurrence of an emergency has been identified in step S12, the hazard level determination unit 112 determines a hazard level for each of the monitoring target areas 60, taking into consideration the emergency that has occurred.

Specifically, for the monitoring target area 60 where the emergency has occurred among the monitoring target areas 60, the hazard level determination unit 112 raises the hazard level in a specified period after the occurrence of the emergency by a specified value. For example, if a traffic accident has occurred in the time slot of 12:00 to 12:10 in a monitoring target area 60 N−1, the hazard level determination unit 112 raises the hazard level of the monitoring target area 60 N−1 in a specified period from the time slot of 12:00 to 12:10 by the specified amount (4 in FIG. 12), as indicated in FIG. 12. Then, the hazard level determination unit 112 slightly lowers the hazard levels of the other monitoring target areas 60 in inverse relation to the amount raised in the hazard level of the monitoring target area 60 N−1.

The specified period and the specified value may be set depending on the type of the emergency that has occurred. For example, a period until the emergency subsides or the like is set as the specified period. The specified value is set depending on the scale of confusion caused by the emergency or the like.

Since the hazard level of the monitoring target area 60 where the emergency has occurred is raised in step S13, more communication resources are allocated to the monitoring target area 60 where the emergency has occurred in step S14, as indicated in FIG. 13. As a result, in step S15, hazard information is preferentially distributed or high-quality hazard information is distributed to the monitoring target area 60 where the emergency has occurred. In step S11, sensor information is preferentially collected or more sensor information is collected from the monitoring target area 60 where the emergency has occurred.

In the above description, the hazard levels of the other monitoring target areas 60 are lowered in inverse relation to the amount raised in the hazard level of the monitoring target area 60 where the emergency has occurred. Therefore, in step S14, the communication resources allocated to the other monitoring target areas 60 are reduced. However, if communication resources are secured for emergencies, the communication resources secured for emergencies can be additionally allocated to the monitoring target area 60 where the emergency has occurred without reducing the communication resources allocated to the other monitoring target areas 60. A state in which communication resources are secured for emergencies is a state in which while there is no occurrence of an emergency, only the rest after excluding part of the communication resources is allocated to each of the monitoring target areas 60 so as to reserve part of the communication resources.

Effects of Embodiment 2

As described above, the communication resource allocation device 10 according to Embodiment 2 raises the hazard level for the monitoring target area 60 where an emergency such as a traffic accident has occurred. As a result, even if an emergency occurs, limited communication resources can be appropriately distributed and safety can be enhanced.

Embodiment 3

Embodiment 3 differs from Embodiments 1 and 2 in that the process to identify hazardous behaviors based on sensor information is performed in the roadside device 30 and the in-vehicle device 40. In Embodiment 3, this difference will be described, and description will be omitted for the same aspects.

In Embodiment 3, a case in which the functions of Embodiment 1 are modified will be described. However, it is also possible to modify the functions of Embodiment 2.
\*\*\*Description of Configuration\*\*\*

Figure 14:
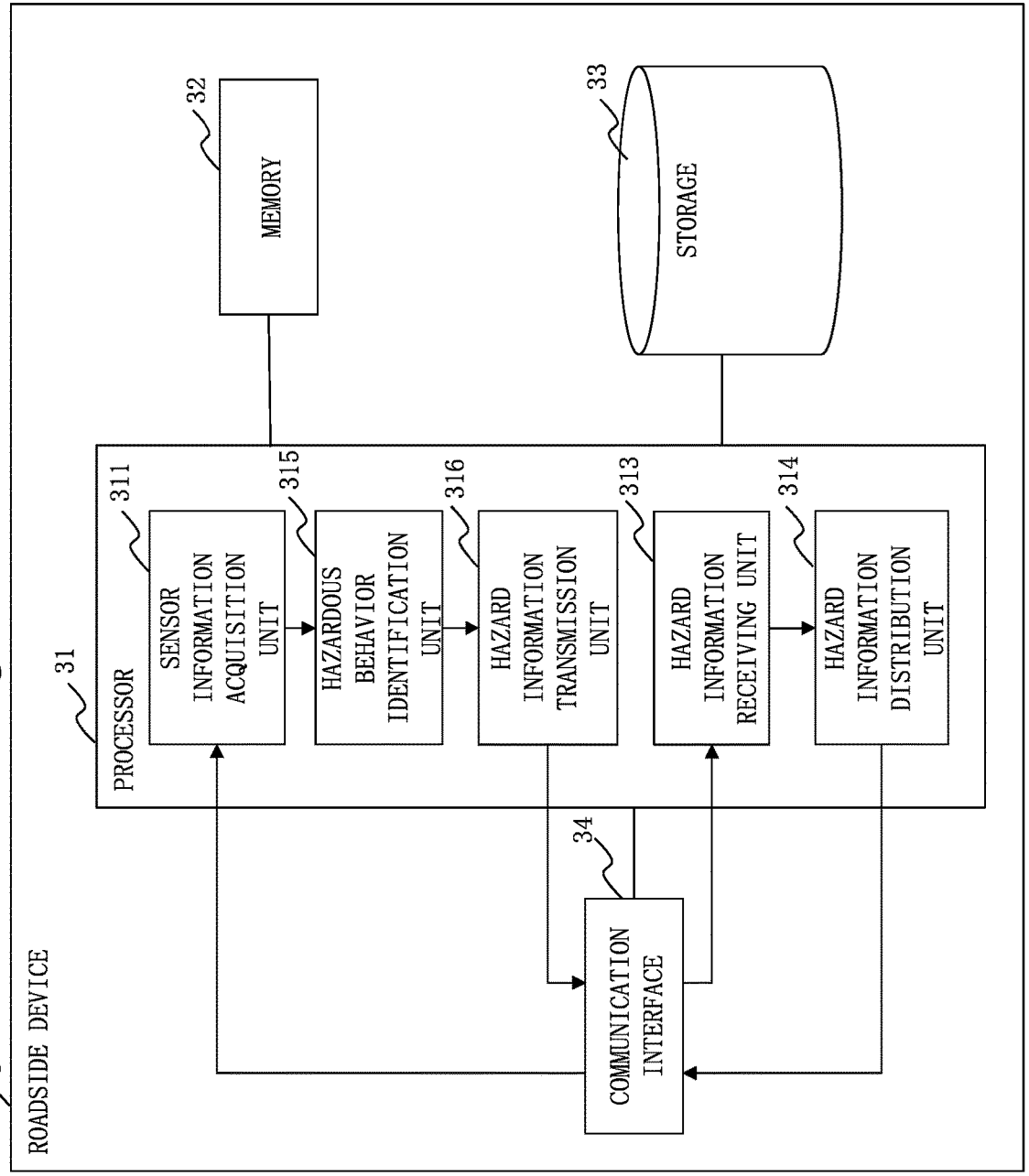
FIG. 14 is a configuration diagram of the roadside device 30 according to Embodiment 3.

Referring to FIG. 14, a configuration of the roadside device 30 according to Embodiment 3 will be described.

The roadside device 30 differs from the roadside device 30 illustrated in FIG. 3 in that it includes a hazardous behavior identification unit 315 and a behavior information transmission unit 316 as functional components in place of the sensor information transmission unit 312. The functions of the hazardous behavior identification unit 315 and the behavior information transmission unit 316 are realized by software or hardware, like the other functional components.

Figure 15:
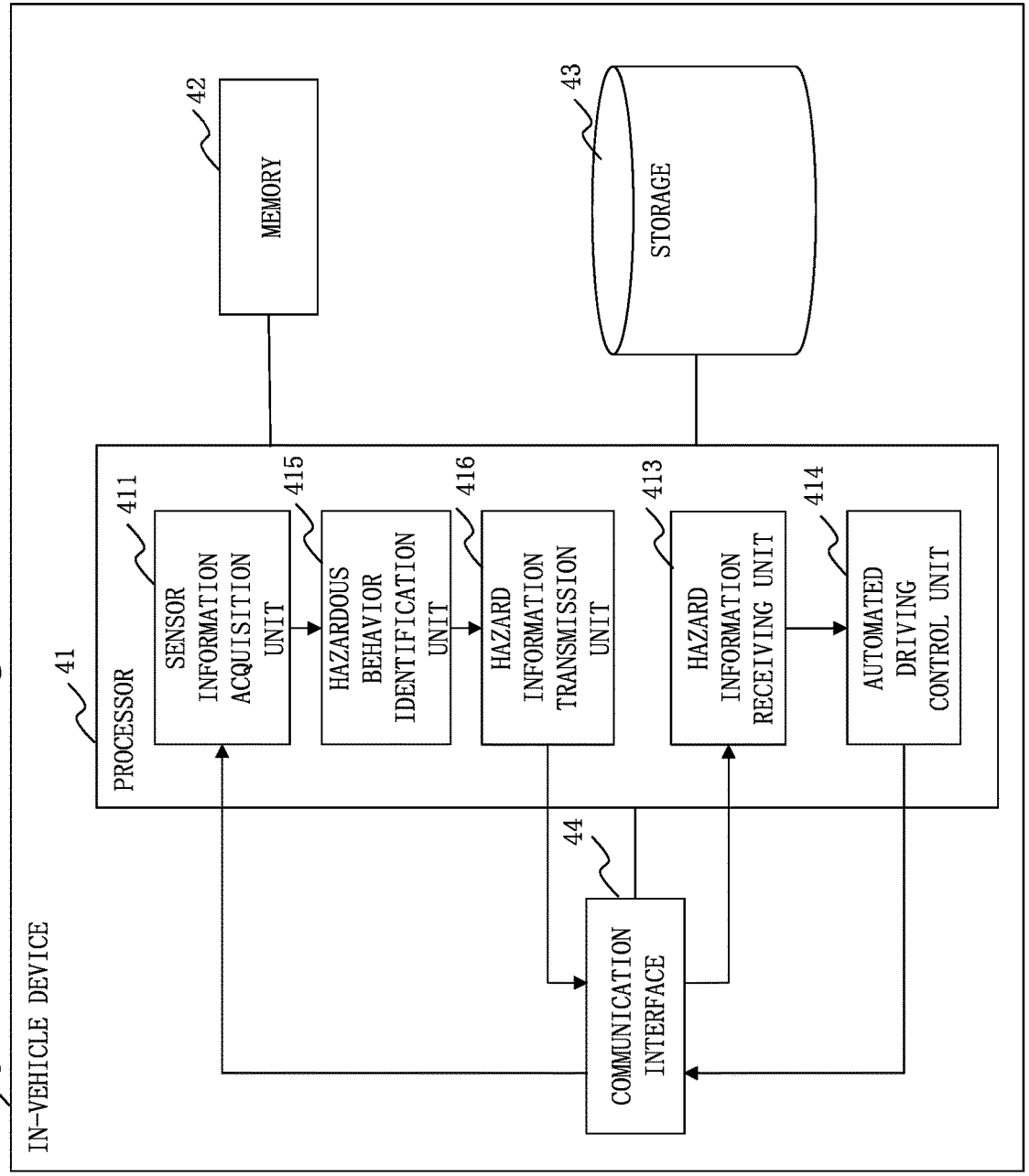
FIG. 15 is a configuration diagram of the in-vehicle device 40 according to Embodiment 3.

Referring to FIG. 15, a configuration of the in-vehicle device 40 according to Embodiment 3 will be described.

The in-vehicle device 40 differs from the in-vehicle device 40 illustrated in FIG. 4 in that it includes a hazardous behavior identification unit 415 and a behavior information transmission unit 416 as functional components in place of the sensor information transmission unit 412. The functions of the hazardous behavior identification unit 415 and the behavior information transmission unit 416 are realized by software or hardware, like the other functional components.
\*\*\*Description of Operation\*\*\*

Figure 16:
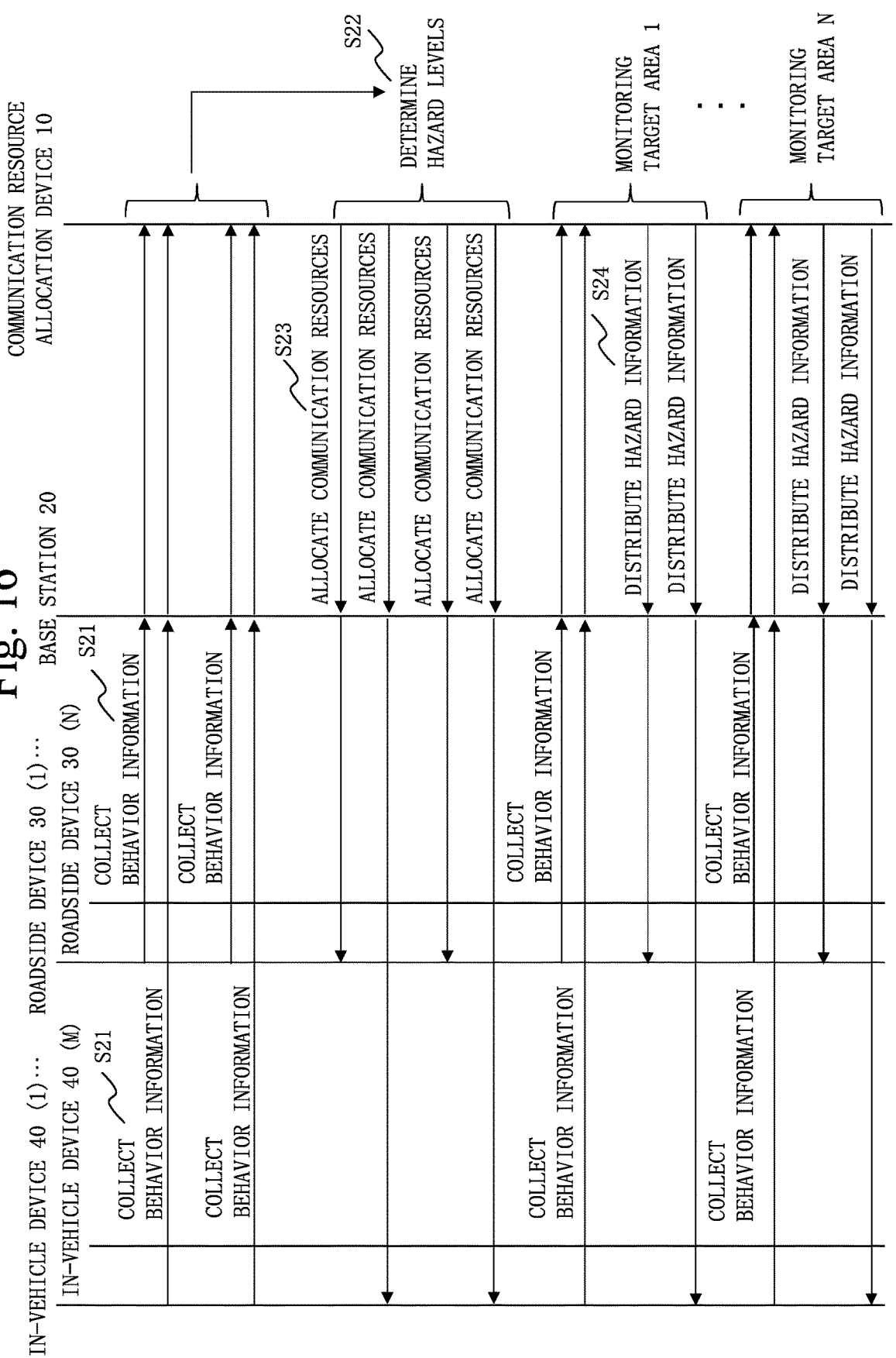
FIG. 16 is a processing flowchart of the main process according to Embodiment 3.

Referring to FIG. 16, operation of the communication resource allocation device 10 according to Embodiment 3 will be described.

The processes of steps S22 to S24 are the same as the processes of steps S13 to S15 in FIG. 6.

(Step S21: Information Collection Process)

The information collection unit 111 collects behavior information indicating hazardous behaviors identified based sensor information acquired by sensors that are present in the communication area of the base station 20.

Specifically, the hazardous behavior identification unit 315 of the roadside device 30 installed in each of the monitoring target areas 60 and the hazardous behavior identification unit 415 of the in-vehicle device 40 present in each of the monitoring target areas 60 identify hazardous behaviors based on sensor information acquired by the sensors mounted in these devices. The behavior information transmission unit 316 of the roadside device 30 and the behavior information transmission unit 416 of the in-vehicle device 40 transmit behavior information indicating the identified behaviors and occurrence locations of the identified behaviors to the communication resource allocation device 10. The information collection unit 111 receives the behavior information transmitted from the roadside device 30 and the in-vehicle device 40. The information collection unit 111 treats a reception time of the behavior information as an occurrence time of the behaviors, and writes the received behavior information together with the reception time in the storage 13.

In step S22, the hazard level determination unit 112 determines a hazard level for each of the monitoring target areas 60 based on hazardous behaviors that have occurred in the past reference period in each of the monitoring target areas 60, as in step S13 of FIG. 6. At this time, the hazard level determination unit 112 determines a hazard level by referring to the behaviors indicated by the behavior information collected in step S21 instead of hazardous behaviors detected by the hazard level determination unit 112.

Effects of Embodiment 3

As described above, in the communication resource allocation device 10 according to Embodiment 3, hazardous behaviors are identified by the roadside device and the in-vehicle device 40. As a result, the amount of information collected by the communication resource allocation device 10 can be reduced. In addition, the processing load of the communication resource allocation device 10 can be reduced.

\*\*\*Other Configurations\*\*\*
<Variation 6>

The communication resource allocation device 10 may collect behavior information from at least either of some of the roadside devices 30 and some of the in-vehicle devices 40, and may collect sensor information from the rest of the roadside devices 30 and the rest of the in-vehicle devices 40. For example, the communication resource allocation device 10 collects behavior information from the roadside devices and the in-vehicle devices 40 that have the function of identifying hazardous behaviors.

As a result, even if the roadside devices 30 and the in-vehicle devices 40 that can detect hazardous behaviors and the roadside devices 30 and the in-vehicle devices that cannot detect hazardous behaviors are both present, the amount of information collected by the communication resource allocation device 10 can be reduced to a certain extent, and the processing load of the communication resource allocation device can also be reduced to a certain extent.

Embodiment 4

Embodiment 4 differs from Embodiments 1 to 3 in that communication resources are allocated to each of the monitoring target areas 60 by specifying a 5G Quality of Service Indicator (5QI) in the 3rd Generation Partnership Project (3GPP) standards for each of the monitoring target areas 60. In Embodiment 4, this difference will be described, and description will be omitted for the same aspects.

In Embodiment 4, a case in which the functions of Embodiment 1 are modified will be described. However, it is also possible to modify the functions of Embodiments 2 and 3.

\*\*\*Description of Operation\*\*\*

Referring to FIGS. 6 and 17, operation of the communication resource allocation device 10 according to Embodiment 4 will be described.

The processes of steps S11 to S13 and the process of step S15 are the same as those in Embodiment 1.

(Step S14: Communication Resource Allocation Process)

The communication resource allocation unit 113 allocates communication resources to each of the monitoring target areas 60 for each time slot based on the hazard level determined in step S13.

At this time, the communication resource allocation unit 113 specifies a 5QI in the 3GPP based on the hazard level for each of the monitoring target areas 60. The 5QI is defined concerning QoS control of 5G. As indicated in FIG. 17, the 5QI is such that a packet delay amount (upper limit of delay) is defined for each 5QI value. Therefore, the communication resource allocation unit 113 specifies a 5QI value with a smaller packet delay amount for the monitoring target area 60 with a higher hazard level. As a result, communication resources are allocated so that communication is performed more preferentially for the monitoring target area 60 with a higher hazard level.

Effects of Embodiment 4

As described above, the communication resource allocation device 10 according to Embodiment 4 allocates communication resources by specifying a 5QI in the 3GPP. As a result, communication resources can be appropriately allocated through simple control.

Each "unit" in the above description may be interpreted as "circuit", "step", "procedure", "process", or "processing circuit".

The embodiments and variations of the present disclosure have been described above. Two or more of these embodiments and variations may be implemented in combination. Alternatively, one or more of them may be partially implemented. The present disclosure is not limited to the above embodiments and variations, and various modifications can be made as needed.

REFERENCE SIGNS LIST

100: communication system, 10: communication resource allocation device, 11: processor, 12: memory, 13: storage, 14: communication interface, 15: electronic circuit, 111: information collection unit, 112: hazard level determination unit, 113: communication resource allocation unit, 114: information distribution unit, 20: base station, 30: roadside device, 31: processor, 32: memory, 33: storage, 34: communication interface, 35: electronic circuit, 311: sensor information acquisition unit, 312: sensor information transmission unit, 313: hazard information receiving unit, 314: hazard information distribution unit, 315: hazardous behavior identification unit, 316: behavior information transmission unit, 40: in-vehicle device, 41: processor, 42: memory, 43: storage, 44: communication interface, 45: electronic circuit, 411: sensor information acquisition unit, 412: sensor information transmission unit, 413: hazard information receiving unit, 414: automated driving control unit, 415: hazardous behavior identification unit, 416: behavior information transmission unit, 51: wired communication channel, 52: wireless communication channel, 53: wireless communication channel.

The invention claimed is:

1. A communication resource allocation device comprising
processing circuitry to:
identify, for each time slot, a hazardous behavior that has occurred in a past reference period in each of monitoring target areas that are included in a communication area and are preset, the hazardous behavior being a behavior that may cause a traffic accident, so as to determine a hazard level for each of the monitoring target areas for each time slot, and
allocate a communication resource to each of the monitoring target areas for each time slot, based on the determined hazard level of each time slot.

2. The communication resource allocation device according to claim 1,
wherein the processing circuitry determines the hazard level for each of the monitoring target areas, taking into consideration a road environment related to occurrence of a traffic accident.

3. The communication resource allocation device according to claim 1,
wherein each of the monitoring target areas is an area, within the communication area, of an intersection where a roadside device is installed.

4. The communication resource allocation device according to claim 1,
wherein for a monitoring target area where an emergency has occurred among the monitoring target areas, the processing circuitry raises a hazard level in a specified period after occurrence of the emergency by a specified value.

5. The communication resource allocation device according to claim 1,
wherein the processing circuitry collects sensor information acquired by a sensor that is present in the communication area, and
identifies a hazardous behavior that has occurred in each of the monitoring target area in the past reference period, based on the collected sensor information.

6. The communication resource allocation device according to claim 5,
wherein the sensor is at least one of a sensor mounted in a vehicle that is present in the communication area, a sensor mounted in a roadside device installed in the communication area, and a sensor mounted in a device owned by a pedestrian who is present in the communication area.

7. The communication resource allocation device according to claim 1,
wherein the processing circuitry collects behavior information indicating the hazardous behavior identified based on sensor information acquired by a sensor that is present in the communication area, and
identifies a hazardous behavior that has occurred in the past reference period in each of the monitoring target areas, based on the collected behavior information.

8. The communication resource allocation device according to claim 1,
wherein the processing circuitry allocates a communication resource to each of the monitoring target areas by specifying a 5G Quality of Service Indicator (5QI) in 3rd Generation Partnership Project (3GPP) standards, based on the hazard level, for each of the monitoring target areas.

9. The communication resource allocation device according to claim 1,
wherein the processing circuitry distributes information to a device that is present in each of the monitoring target areas, using the allocated communication resource.

10. A communication resource allocation method comprising:
identifying, for each time slot, a hazardous behavior that has occurred in a past reference period in each of monitoring target areas that are included in a communication area and are preset, the hazardous behavior being a behavior that may cause a traffic accident, so as to determine a hazard level for each of the monitoring target areas for each time slot; and
allocating a communication resource to each of the monitoring target areas for each time slot, based on the hazard level of each time slot.

11. A non-transitory computer readable medium storing a communication resource allocation program that causes a computer to function as a communication resource allocation device to perform:
a hazard level determination process of identifying, for each time slot, a hazardous behavior that has occurred in a past reference period in each of monitoring target areas that are included in a communication area and are preset, the hazardous behavior being a behavior that may cause a traffic accident, so as to determine a hazard level for each of the monitoring target areas for each time slot; and
a communication resource allocation process of allocating a communication resource to each of the monitoring target areas for each time slot, based on the hazard level of each time slot determined by the hazard level determination process.

* * * * *